United States Patent [19]

Binsack et al.

[11] 4,025,492

[45] May 24, 1977

[54] THERMOPLASTIC COPOLYESTERS AND A PROCESS FOR THEIR PRODUCTION

[75] Inventors: Rudolf Binsack; Ludwig Bottenbruch, both of Krefeld; Hans Hespe, Leverkusen, all of Germany

[73] Assignee: Bayer Aktiengesellschaft, Germany

[22] Filed: June 24, 1975

[21] Appl. No.: 589,912

[30] Foreign Application Priority Data

June 28, 1974 Germany .................... 2431072

[52] U.S. Cl. .................... 260/75 R; 260/75 M
[51] Int. Cl.$^2$ .................... C08G 63/18; C08G 63/26
[58] Field of Search .................... 260/75 R, 75 M

[56] References Cited

UNITED STATES PATENTS

| 3,692,744 | 9/1972 | Pich et al. .................... 260/75 R X |
| 3,817,935 | 6/1974 | Beer .................... 260/75 R |
| 3,966,827 | 6/1976 | Aquila et al. .................... 260/75 R X |

FOREIGN PATENTS OR APPLICATIONS

| 879,151 | 8/1971 | Canada |
| 2,038,039 | 12/1970 | France |

Primary Examiner—Howard E. Schain
Assistant Examiner—W. C. Danison, Jr.
Attorney, Agent, or Firm—Connolly and Hutz

[57] ABSTRACT

The heat distortion resistance and the molecular weight of polypropylene terephthalate and polybentylene terephthalate can be increased by cocondensing up to 10 mol-% of aliphatic diols containing 5 to 10 carbon atoms or of cycloaliphatic diols containing 8 to 12 carbon atoms.

3 Claims, No Drawings

THERMOPLASTIC COPOLYESTERS AND A PROCESS FOR THEIR PRODUCTION

This invention relates to thermoplastic, highly crystalline linear copolyesters with a higher melting temperature, greater crystallinity and a higher heat distortion temperature than the corresponding homopolyesters themselves.

Injection-mouldable polyalkylene terephthalates are widely used in the thermoplast-processing industry because of their favourable properties, such as their high resistance to wear, their favourable creep rupture strength and their high dimensional stability. Polyethylene terephthalate (PET) has acquired considerable significance above all as a raw material for fibres and films, whilst polypropylene terephthalate (PPT) and polybutylene terephthalate (PBT) are primarily used as structural materials. In this respect, they are preferred to PET by virtue of their comparatively higher crystallisation rate which makes it possible to reduce mould temperatures and moulding times. In addition, the high crystallinity of PPT and PBT contributes significantly towards the high dimensional stability under heat for which they are known.

In many cases the heat distortion resistance of PPT and PBT is not sufficient thus making it necessary to use PET which has a greater heat distortion resistance than PPT and PBT. The great disadvantage of PET, namely high moulding temperatures and long cycle times caused by the comparitively low crystallization speed has thereby to be taken into account.

There are essentially two measures in polyalkylene terephthalate technology by which molecular weight can be increased, namely the chain extension process and aftercondensation in the solid phase. Both processes enable high molecular weight and, hence, highly viscous polycondensates to be produced. Since the durability properties and especially the viscosity of a polycondensate are known to be critically determined by its molecular weight it would seem desirable further to increase the molecular weight of PPT and PBT beyond the hitherto possible level whilst, at the same time, avoiding new disadvantages. Intrinsic viscosity, as measured in phenol/tetrachloroethane (1:1 parts by weight) at 25° C, is used hereinafter as a measure of the molecular weight.

It has now unexpectedly been found that in addition to a surprising increase of the heat distortion resistance the molecular weight of PPT and PBT can be considerably increased by copolymerising certain diols. The resulting copolyesters have a greater heat distortion resistance and a higher viscosity than PPT and PBT themselves but do not suffer from adverse effects upon crystallinity or a reduction in melting temperature. On the contrary, it is even possible in many cases to yield better values of these properties. This result appears all the more surprising insofar as experience has generally shown copolyesters to have lower crystallinity and lower melting temperatures and, hence, lower elasticity moduli, lower tensile strengths and poorer dimensional stabilities under heat than the corresponding homopolyesters (cf. for example J. G. Smith et al, J. Polym.-Sci.,A-1, Vol 4 (1966), 1851).

The present invention relates to a process for producing thermoplastic, highly crystalline, linear statistical copolyesters based on dicarboxylic acid diol esters distinguished by the fact that 1 mol of a dicarboxylic acid component, of which at least 90 mol % consists of terephthalic acid or an ester-forming derivative thereof, is subjected to a melt condensation process known per se with from 1.1 to 2.5 mols of a diol component, of which 90 to 99.5 mol % consists of 1,3-propane diol or 1,4-butane diol and 0.5 to 10 mol % of an aliphatic diol with from 5 to 10 carbons or a cycloaliphatic diol with from 8 to 12 carbon atoms, after which condensation is continued in known manner in the solid phase either in an inert gas or in vacuo at a temperature from 5 to 50° C below the polyester melting temperature until an intrinsic viscosity of $\geq$ 0.6 dl/g is reached.

The primary condensate is preferably subjected to the solid-phase post condensation reaction in a uniform grain size in order to guarantee optimum polycondensation.

The invention also relates to the copolyesters obtained according to the process of the invention.

According to a preferred method of carrying out the process, the starting coponents are heated to not more than 200° C in the first condensation stage and kept at this temperature until all the volatile decomposition products, as well as free butanediol, have distilled off. The second stage of condensation may be carried out in known manner under vacuum at temperatures of between 250° and 310° C.

Both the first and the second stage of condensation are preferably carried out in the presence of catalysts.

Suitable catalysts are those which are described e.g. by R. E. Wilfong in Journal of Polymer Science, Vol. 54, 385 (1961). Some of these catalysts are more effective for the esterification reaction (a) and others for the polycondensation step (b), while some of them are rather effective catalysts for both (c).

Catalysts (a) which may be used for accelerating the first stage of condensation are e.g.:
1. lithium, sodium, potassium, calcium, strontium, and boron as the metal, oxide hydride, formate, acetate, alcoholate, or glycolate;
2. calcium and strontium chlorides and bromides;
3. tertiary amines;
4. calcium and strontium malonate, adipate, benzoate etc.;
5. lithium salts of dithiocarbamic acids.

Catalysts (b) which may be used for accelerating the polycondensation step, are e.g.;
1. molybdenum, germanium, lead, tin, antimony as the metal, oxide, hydride, formate, alcoholate, or glycolate;
2. zinc and lead perborates and borates;
3. zinc, manganous, cobalt, magnesium, chromium, iron, and cadmium, succinate, butyrate, adipate or enolate of a diketone;
4. zinc chloride and bromide;
5. lanthanum dioxide and titanate;
6. neodym chloride;
7. double salts of antimony, such as potassium antimonyl tartrate, and salts of antimony acids, such as potassium pyroantimonate;
8. zinc or manganese salts of dithiocarbamic acids;
9. cobalt naphthenate;
10. titanium tetrafluoride or tetrachloride;
11. alkyl orthotitanates;
12. titanium tetrachloride-ether complexes; 13. quaternary ammonium salts containing a titanium hexalkoxy radical; titanium tetraalkoxides, alkali or alkaline earth metal compounds with aluminium, zirconium, or titanium alkoxides;
14. organic quaternary ammonium, sulfonium, phosphonium, and oxonium hydroxides and salts;
15. barium, malonate, adipate, benzoate etc.;
16. lead, zinc, cadmium or manganese salt of the monoalkyl ester of a phenylene dicarboxylic acid.
17. antimonyl catechol complexes with an amino alcohol or an amine and an alcohol;
18. uranium trioxide, tetrahalide, nitrate, sulfate, acetate.

Catalysts (c) which are effective catalsyts for both reaction steps, are e.g.:
1. barium, magnesium, zinc, cadmium, aluminium, manganese cobalt as the metal, oxide, hydride, formate, alcoholate, glycolate, preferably as the acetate;
2. aluminium chloride and bromide;
3. zinc, manganous, cobalt, magnesium, chromium, iron, and cadmium succinate, butyrate, adipate or enolate of a diketone.

The most preferred catalysts (a) suitable for the invention is sodium acetate.

The most preferred catalysts (b) suitable for the invention, are the compounds of zinc, manganese, cobalt, antimony, germanium, titanium, and tin; especially titanium compounds which may be used together with other known polycondensation catalysts such as titanic acid esters, e.g. tetraisopropyl titanate.

The catalysts are used in amounts of 0.001 – 0.2 % by weight, based on terephthalic acid. The post-condensation is usually carried out in the presence of the known polycondensation catalysts, too.

Inhibitors are usually added to the reaction mixture to inhibit these catalysts after termination of the first stage of condensation and to increase the stability of the end products. Suitable inhibitors are those described in H. Ludewig, Polyesterfasern, 2nd edition, Akademie-Verlag, Berlin (1974).

Examples of said inhibitors are phosphoric acid, phosphorous acid and aliphatic, aromatic or araliphatic esters thereof; e.g. alkyl esters containing from 6 to 18 carbon atoms in the alcohol components, phenyl esters whose phenyls may optionally be substituted by 1 to 3 substituents containing from 6 to 18 carbon atoms such as trinonylphenyl, dodecylphenyl or triphenyl phosphate. The inhibitors are generally used in amounts of from 0.01 to 0.6% by weight, based on terephthalic acid.

The polytetramethylene esters obtained according to the invention are outstanding starting materials especially for injection moulding, but also for fibres, and for foils.

In addition to terephthalic acid or its ester-forming derivatives, it is also possible to use, as dicarboxylic acid components, up to 10 mol % of other aromatic or saturated aliphatic dicarboxylic acids such as, for example, phthalic acid, isophthalic acid, adipic acid, sebacic acid or the esterforming derivatives of these compounds, such as anhydrides or esters.

Examples of aliphatic diols with from 5 to 12 carbon atoms or cycloaliphatic diols with from 8 to 12 carbon atoms are 2-ethyl-1,3-propane diol, 3-methyl-1,5-pentane diol and 2-ethyl-2-methoxymethyl-1,3-propane diol.

The copolyesters according to the invention preferably contain known inhibitors which prevent undesirable influence of oxygen, in the usual quantities, preferably in quantities of from 0.001 to 0.1% by weight, based on the copolyesters. Suitable polymerisation inhibitors are phenols and phenol derivatives, preferably sterically hindered phenols, which contain alkyl substituents with from 1 to 6 carbon atoms in both o-positions to the phenolic hydroxy group; amines, preferably secondary aryl amines and their derivatives; quinones; copper salts of organic acids; and addition compounds of Cu(I)-halides with phosphites. Specific examples are 4,4'-bis-(2,6-di-tert-butylphenol), 1,3,5-trimethyl-2,4,6-tris-(3,5-di-tert-butyl-4-hydroxybenzyl)-benzene, 4,4'-butylidene-bis-(6-tert-butyl-m-cresol), 3,5-di-tert-butyl-4-hydroxy benzyl phosphonic acid diethyl ester, N,N'-bis-($\beta$-naphthyl)-p-phenylene diamine, N,N'-(1-methylheptyl)-p-phenylene diamine, phenyl-$\beta$-naphthyl amine, 4,4'-bis-($\alpha,\alpha$-dimethylbenzyl)-diphenyl amine, 1,3,5-tris-(3,5-di-tert-butyl-4-hydroxy hydrocinnamoyl)-hexahydro-s-triazine, hydroquinone, p-benzoquinone, toluhydroquinone, p-tert-butyl pyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite and p-nitrosodimethyl aniline.

In addition, up to 300% by weight, and preferably from 50 to 200% by weight, based on the copolyesters, of fillers may be added to the copolyesters according to the invention. Suitable fillers are inorganic materials, such as calcium carbonate, silicates, aluminas, lime, carbon, asbestos, glass, metals, generally in the form of fibres, woven fabrics or mats, and organic fillers such as cotton, sisal, jute, polyesters and polyamide, again in the form of fibres or woven fabrics, Preferred fillers are glass fibres.

In addition, it is of course possible, if desired, to add inorganic or organic pigments, dyes, lubricants and release agents such as zinc stearate, UV-absorbers, etc., in the usual quantities.

In cases where flameproof products are required, it is possible to add from 2 to 20% by weight, based on the moulding composition, of flameproofing agents known per se, such as for example tetrabromophthalic acid anhydride, hexabromocyclododecane, tetrachloro- and tetrabromo-bisphenol A, tris-(nonylphenyl)-phosphite, bis-polyoxyethylene hydroxy methyl phosphonate or tris-(2,3-dichloropropyl)-phosphate, either individually or in combination with antimony trioxide.

In addition, processing aids, such as nucleating agents and mould-release aids, may be added in effective quantities. It has proved to be particularly suitable to add from 0.1 to 1% by weight based on the copolyesters, of talcum as a nucleating agent and/or from 0.1 to 3% by weight, based on the copolyesters of a sodium montanate as a mould-release aid. 1% by weight of talcum as a nucleating agent and/or from 0.1 to 3% by weight of a sodium montanate as a mould-release aid.

EXAMPLES 1 to 6

97.1 g (0.5 mol) of dimethyl terephthalate are transesterified for 2 hours at 200° C with 0.7 mol of a mixture of 1,4-butane diol and 3-methyl-1,5-pentane diol in the presence of 0.05 g of titanium tetraisopropylate. On completion of transesterification, the temperature of the transesterification product is increased over a period of 1 hour to 260° C and, at the same time, the pressure prevailing in the reaction vessel is reduced from 760 Torr to 0.5 Torr. After the temperature of 260° C and the pressure of 0.5 Torr have been reached, polycondensation is continued for 45 minutes, resulting in the formation of a clear viscous melt of the copolyester. After cooling, this copolyester is size-reduced to an average grain size of 2mm, after which condensation is continued in vacuo for another 20 hours at 200° C.

Examples 1 to 3 relate to the copolyesters according to the invention obtained from 1 to 10 mol % of 3-methyl-1,5-pentane diol, based on the starting diol component.

Example 6 uses pure polybutylene terephthalate and is for comparison.

Examples 4 and 5 demonstrate the deterioration in the properties of the copolyesters when the proportion of 3-methyl-1,5-pentane diol is increased beyond 10 mol %, based on the starting diol component.

EXAMPLE 7

38.84 g (0.2 mol) of dimethyl terephthalate are transesterified for 2 hours at 200° C with a mixture of 24.4 g (0.271 mol) of 1,4-butane diol and 0.90 g (0.00864 mol) of 2-ethyl-1,3-propane diol in the presence of 0.02 g of titanium tetraisopropylate. The temperature is then increased over a period of 1 hour to 260° C whilst, at the same time, the pressure is reduced to 0.5 Torr. Polycondensation is over after another 45 minutes. The viscous melt of the copolyester formed solidifies on cooling into a white, crystalline mass. After size reduction to a grain size of approximately 2 mm, the copolyester obtained is further condensed in vacuo for 20 hours at 200° C. For properties see Table 2.

EXAMPLE 8

The comonomeric diol, 2-ethyl-1,3-propane diol, in Example 7 is replaced by 1.32 g (0.00891 mol) of 2-ethyl-2-methoxymethyl-1,3-propane diol. The properties of the copolyester are shown in Table 2.

TABLE 1

| Example | 1,4-butane diol g | 1,4-butane diol mol | mol% | 3-methyl-1,5-pentane diol g | 3-methyl-1,5-pentane diol mol | 3-methyl-1,5-pentane diol mol % | melt condensate $[\eta]$ dl/g | melt condensate $T_m$ °C | melt condensate $\Delta H$ cal/g | solid-phase condensate (20 hours/200° C/0.5 Torr) $[\eta]20$ dl/g | solid-phase condensate $T_m$ °C | solid-phase condensate $\Delta H_{20}$ cal/g |
|---|---|---|---|---|---|---|---|---|---|---|---|---|
| 1 | 62.45 | 0.693 | 99 | 0.83 | 0.007 | 1 | 0.63 | 220 | 11.2 | 2.23 | 232 | 15.7 |
| 2 | 59.93 | 0.665 | 95 | 4.14 | 0.035 | 5 | 0.65 | 215 | 11.0 | 2.25 | 227 | 14.1 |
| 3 | 56.78 | 0.63 | 90 | 8.27 | 0.07 | 10 | 0.54 | 206 | 9.5 | 2.84 | 230 | 12.0 |
| 4 | 53.62 | 0.595 | 85 | 12.41 | 0.105 | 15 | 0.46 | 199 | 9.0 | 2.51 | 221 | 10.9 |
| 5 | 47.31 | 0.525 | 75 | 20.68 | 0.175 | 25 | 0.49 | 168 | 7.9 | 1.74 | 161 | 4.3 |
| 6 | 63.08 | 0.07 | 100 | — | — | — | 0.60 | 225 | 11.2 | 1.52 | 223 | 8.0 |

The symbols used in the above Table have the following meanings:
$[\eta]$ = intrinsic viscosity in phenol/tetrachloroethane (1:1), as measured in an Ubbelohde capillary viscosimeter
$T_m$ = melt temperature
$T_c$ = crystallisation temperature

TABLE 2

| Example | Butane diol mol % | Co-diol type | Co-diol mol % | melt polycondensate $[\eta]$ | melt polycondensate $T_m$ °C | melt polycondensate $\Delta H$ cal/g | solid-phase polycondensate (20 hours/200° C/0.5 Torr) $[\eta]$ | solid-phase polycondensate $Tm_{20}$ °C | solid-phase polycondensate $\Delta H_{20}$ cal/g |
|---|---|---|---|---|---|---|---|---|---|
| 7 | 96.8 | EPD[1] | 3.1 | 0.54 | 219 | 10.9 | 2.00 | 229 | 15.5 |
| 8 | 96.8 | EMPD[2] | 3.2 | 0.56 | 220 | 10.8 | 1.97 | 231 | 15.6 |

1) EPD: 2-ethyl-1,3-propane diol
2) EMPD: 2-ethyl-2-methoxymethyl-1,3-propane diol

We claim:
1. A thermoplastic highly crystalline, linear, statistical copolyester produced by the process of melt condensing 1 mol of a dicarboxylic acid component of which at least 90 mol % consists of terephthalic acid or an ester forming derivative thereof with 1.1 to 2.5 mols of a diol component of which from 90 to 99.5 mol % consists of 1,3-propanediol or 1,4-butanediol and from 10 to 0.5 mol % thereof consists of a codiol selected from the group consisting of 2-ethyl-1,3-propanediol, 3-methyl-1,5-pentanediol and 2-ethyl-2-methoxymethyl-1,3-propanediol and thereafter continuing said condensation in the solid phase either under an inert gas or under vacuum at a temperature of from 5° to 50° C below the polyester melting temperature until an intrinsic viscosity of at least 0.6 dl/g is obtained, said intrinsic viscosity being measured in a 1:1 mixture of phenol and tetrachloroethane at a temperature of 25° C.

2. The copolyester of claim 1 wherein said codiol is 2-ethyl-1,3-propanediol.

3. The copolyester of claim 1 wherein said codiol is 3-methyl-1,5-pentanediol.

* * * * *